US007565010B2

United States Patent
Grady (10) Patent No.: US 7,565,010 B2
(45) Date of Patent: Jul. 21, 2009

(54) SYSTEM AND METHOD FOR IMAGE SEGMENTATION BY A WEIGHTED MULTIGRID SOLVER

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 682 days.

(21) Appl. No.: 11/234,977

(22) Filed: Sep. 26, 2005

(65) Prior Publication Data
US 2006/0147115 A1     Jul. 6, 2006

Related U.S. Application Data (60) Provisional application No. 60/641,790, filed on Jan. 6, 2005.

(51) Int. Cl.
*G06K 9/34* (2006.01)
(52) U.S. Cl. ...................................................... 382/173
(58) Field of Classification Search ........................ None
See application file for complete search history.

(56) References Cited

U.S. PATENT DOCUMENTS

| | | | | |
|---|---|---|---|---|
| 5,727,081 A * | 3/1998 | Burges et al. | ............... | 382/229 |
| 5,978,497 A * | 11/1999 | Lee et al. | ................... | 382/133 |
| 6,263,103 B1 * | 7/2001 | Freeman et al. | ............ | 382/173 |
| 6,718,063 B1 * | 4/2004 | Lennon et al. | .............. | 382/224 |
| 6,744,923 B1 * | 6/2004 | Zabih et al. | ................. | 382/226 |
| 6,785,409 B1 * | 8/2004 | Suri | .......................... | 382/128 |
| 2004/0008886 A1 * | 1/2004 | Boykov | ..................... | 382/173 |
| 2004/0086185 A1 * | 5/2004 | Sun | ............................ | 382/224 |

* cited by examiner

*Primary Examiner*—Matthew C Bella
*Assistant Examiner*—Yuzhen Ge (57) ABSTRACT

A method of segmenting a digitized image includes providing a digitized image on a domain of points on an N%N grid, defining a weight between each pair of adjacent points in the image based on the intensity difference of each said point pair, marking a subset of points in the image, associating a probability potential with each unmarked point, and using a multigrid method to solve for the probability potentials for each unmarked point, wherein a restriction operator for the image is applied to an (N−1)%(N−1) image wherein each image weight is treated as a function of an adjoining point for application of the restriction operator, wherein said restriction operator determines weights of a coarse level grid.

22 Claims, 3 Drawing Sheets

(a) Coarse-level solution    (b) Unweighted projection    (c) Weighted projection

SYSTEM AND METHOD FOR IMAGE SEGMENTATION BY A WEIGHTED MULTIGRID SOLVER

CROSS REFERENCE TO RELATED UNITED STATES APPLICATIONS

This application claims priority from "A Weighted Multigrid Solver for Computing Anisotropic (Inhomogeneous) Laplacian System", U.S. Provisional Application No. 60/641,790 of Leo Grady filed Jan. 6, 2005, the contents of which are incorporated herein by reference.

TECHNICAL FIELD

This invention is directed to automated and semi-automated segmentation, filtration, and colorization of digitized images.

DISCUSSION OF THE RELATED ART

One goal of automated medical image analysis is how to best take advantage of input from the technician or medical practitioner who will be performing the analysis. The current state-of-the art is such that few automated image analysis techniques can be applied fully autonomously with reliable results. Consequently, the practitioner should evaluate the results of any automated process. In general, this person is currently performing the analysis manually. The goal of the automation is to shorten the time and improve the reliability of the analysis.

Frequently a medical image acquisition device is used for multiple medical indications and studies. In this case the goal of image analysis varies with the patient symptoms and history. For example, a cardiac image can admit several "correct" segmentations depending on the nature of the region of interest, such as the entire heart or a specific ventricle or atria. The knowledge of the goal for the analysis is entirely with the user. However, by specifying the number of segments and by providing small samples of each segment the goal of the segmentation can be better defined for an automated approach.

Segmentation, along with image filtering and image colorization, is an example of an application solved by the inhomogeneous Laplace (Poisson) equation with internal Dirichlet boundary conditions. Although solution algorithms for this equation are framed in a discrete (graph) setting, these algorithms have been almost exclusively employed in a rectilinear coordinate system that results in a possibly widely banded Laplacian matrix. Despite the banded structure of the matrix representing the Laplacian on a 2D grid, traditional Laplace/Poisson solvers are inappropriate due to the inhomogeneity of the PDE coefficients. The efficiency of a solution to the inhomogeneous equations can be addressed by introducing a weighted multigrid approach that builds on homogeneous multigrid methods.

SUMMARY OF THE INVENTION

Exemplary embodiments of the invention as described herein generally include methods and systems for solving the inhomogeneous Laplace (Poisson) equation with internal Dirichlet boundary conditions that involve a geometric multigrid approach using weighted prolongation/restrictions operators and an appropriate system coarsening.

According to one aspect of the invention, there is provided a method for segmenting a digitized image comprising the steps of providing a digitized image comprising a plurality of intensities corresponding to a domain of points on an N%N grid, defining a weight between each pair of adjacent points in the image based on the intensity difference of each said point pair, marking a subset of points in the image, associating a probability potential with each unmarked point, and using a multigrid method to solve for the probability potentials for each unmarked point, wherein a restriction operator for the image is applied to an (N−1)%(N−1) image wherein each image weight is treated as a function of an adjoining point for application of the restriction operator, wherein said restriction operator determines weights of a coarse level grid.

According to a further aspect of the invention, the probability potential for each unmarked point represents the probability that a random walker starting from said point reaches a marked point.

According to a further aspect of the invention, the probability that a random walker starting from an unmarked point reaches a marked point is calculated for each marked point.

According to a further aspect of the invention, each said weight $w_{ij}$ between a point $v_i$ adjacent to point $v_j$ is determined by $$w_{ij} = \exp(-\beta(g_i - g_j)^2),$$

where $g_i$ and $g_j$ are the intensities of points i and j, respectively, and $\beta$ is a free parameter.

According to a further aspect of the invention, the method includes representing said image by a Laplacian matrix L indexed by point pairs, wherein an element $L_{ij}$ for points i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

where $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability potential for each unmarked point i with respect to a marked point s by $x_i^s$, said unmarked probability potentials forming a vector $x_U$, wherein the probability potentials for each unmarked point can be determined by solving $L_U x_U = f$ wherein $f$ is a function.

According to a further aspect of the invention, a point is assigned to a segment of a marked node according to $\max_s (x_i^s)$.

According to a further aspect of the invention, the multigrid method comprises calculating an approximate solution to the probabilities on a fine level grid, calculating a residual to the solution, restricting the residual to said coarse level grid with said restriction operator, calculating a correction for the residual on the coarse level grid, and correcting the approximate solution on said fine level grid with a prolonged correction using a prolongation operator, wherein said prolongation operator is an adjoint of said restriction operator.

According to a further aspect of the invention, the prolongation operator from a point $x^1(i, j)$ on the coarse grid to a point on the fine grid $x^0$ is defined by the transformations $$x^0(2i, 2j) = x^1(i, j) \forall\, i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a point and their corresponding weights.

According to a further aspect of the invention, the restriction operator from a point on the fine grid $x^0$ to a point $x^1(i, j)$ on the coarse grid is defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E + x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a point and their corresponding weights, and the factors $d_E$, $d_W$, $d_N$, $d_S$ denote the corresponding degrees of the neighboring points.

According to a further aspect of the invention, a coarse level point is marked if any of its fine level neighbor points are marked.

According to another aspect of the invention, there is provided a program storage device readable by a computer, tangibly embodying a program of instructions executable by the computer to perform the method steps for segmenting a digitized image.

DETAILED DESCRIPTION OF THE PREFERRED EMBODIMENTS

Exemplary embodiments of the invention as described herein generally include systems and methods for applying a multigrid solver to the inhomogeneous Laplace (Poisson) equation with internal Dirichlet boundary conditions. Given knowledge of a certain quantity of interest at certain pixels, referred to as seeds, appropriate quantities are assigned to the unlabeled pixels that reflect the spatial structure of the image. The quantities of interest can include, but are not limited to, object labels, grayscale intensities, or colors, and the seed pixels can without limitation be provided by a user. The seed pixels are then set to be the Dirichlet boundary conditions, despite being internal to the domain of the image, the pixel intensities define the coefficients or weights, and the Laplace (or Poisson) equation is solved to detemine the quantities at the unlabeled pixels. This approach respects weak or absent object boundaries, has provable robustness to noise, and can be interpreted as a random walk on the domain of the image.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The language of graph theory is suitable for problems formulated on a discrete space, such as a digitized image. A graph is a pair $G=(V; E)$ with vertices (nodes) $v \in V$ and edges $e \in E \subseteq V \times V$. An edge, $e$, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$. The degree of a vertex is $d_i = \Sigma w(e_{ij})$ for all edges $e_{ij}$ incident on $v_i$. If $w_{ij}$ is interpreted as the bias affecting a random walker's choice, then $w_{ij} > 0$. In the context of 2D image processing, the graph nodes are taken as the image pixels, which lie on a rectangular, 4-connected, grid. Image intensities can be converted into edge weights (i.e., diffusion constants) through many different methods. One exemplary, non-limiting weighting function is the Gaussian weighting function given by $w_{ij} = \exp(-\beta(g_i - g_j)^2)$, where $g_i$ indicates the image intensity at pixel i. The value of $\beta$ is a free parameter. Another possible weighting function would maximize the entropy of the resulting weights. Although these values may be interpreted as diffusion constants, they shall be referred to herein as weights.

The discrete Laplacian matrix can be defined as $$L_{v_i v_j} = \begin{cases} d_{v_i} & \text{if } i = j, \\ -w_{ij} & \text{if } v_i \text{ and } v_j \text{ are adjacent nodes}, \\ 0 & \text{otherwise} \end{cases}$$

where $L_{v_i v_j}$ is used to indicate that the matrix L is indexed by vertices $v_i$ and $v_j$.

Given a set of marked pixels subject to Dirichlet boundary conditions, where the pixels can be marked either interactively or automatically, the vertices can be partitioned into two disjoint sets, $V_M$ (marked/seed nodes) and $V_U$ (unmarked nodes) such that $V_M \cap V_U = V$ and $V_M \cup V_U = 0$. The Laplacian can then be decomposed and reordered into the form $$L = \begin{bmatrix} L_M & B \\ B^T & L_U \end{bmatrix},$$

corresponding to the marked/unmarked sets. Here, $L_U$ is the Laplacian for the unmarked nodes, $L_M$ is the Laplacian for the marked nodes, and B (and its transpose $B^T$) comprise those elements of L that are left over. Fixing some of the nodes as "boundary" nodes results in their removal from the Laplacian matrix and incorporation into the right hand side. This formulation can be reduced to solving $$L_U x_U = f,$$

for $x_U$ in the presence of some right hand side, $f$, that depends on the application. In the context of potential theory, the quantities $x_U$ can be referred to as the potentials for the unmarked set. The potentials of the marked set are assumed known and fixed.

According to embodiment of the invention, the anisotropic diffusion equation has a similar formulation, with $V_M = 0$ and $V_U = V$. In this embodiment, the solution of the combinatorial diffusion requires a solution to $$\frac{dx}{dt} = -Lx,$$

given some time t and an initial distribution $x_0$. A backward Euler approximation can be used to replace this differential equation with a linear system $$\left(\frac{1}{t}I + L\right)x = \frac{1}{t}x_0,$$

which is equivalent to the system presented above, with $$f = \frac{1}{t}x_0$$

and a constant addition to the diagonal of L. Since this formulation typically does not have imposed Dirichlet boundary conditions, a less complicated multigrid approach can be utilized for its solution. Note that the addition of a constant term to the diagonal of the Laplacian matrix can be ignored. Due to the application to diffusion, and to simplify notation, the subscripts of L and x denoting $V_U$ will be dropped in the remainder of this disclosure, except where appropriate.

Multigrid methods can be used to solve linear systems such as the one in question, where L is generated from an elliptic or parabolic partial differential equation (PDE), in a computationally effective manner. In general, there are two branches of the method: geometric and algebraic. Algebraic multigrid approaches aspire to a "black box" method that can apply the technique to an arbitrary linear system. In contrast, geometric methods evolved out of attempts to solve PDEs on a rectilinear domain (especially elliptic and parabolic systems) where it may be assumed that coarsened versions of the operator also represent rectilinear grids. Although discrete in nature, and therefore equally defined on arbitrary graphs, application of these methods to standard images results in a Laplacian operator with a sparsity structure that represents a grid.

Standard iterative methods for solving PDEs, represented discretely as $Au = f$, where u is an unknown, reduce high frequency errors, but not low frequency errors due to an excessive number of iterations needed for convergence. Multigrid methods can correct for low frequency errors by computing a smooth correction function on a coarse resolution grid and interpolating the correction onto a fine resolution grid to correct the current iteration of u. The idea is that the coarse-grid updates correct low-frequency errors, while fine grid relaxations correct high-frequency errors. In order to produce the coarse grid correction, the multigrid method is applied recursively, forming what is referred to as a V-cycle, described as follows. Denote the relaxation iterations parameter by v, the residual vector by r, the current (intermediate) solution at level k as $x^k$, the coarsened operator at level k as $L^k$, the restriction operator as R, and the prolongation operator as P. Since the prolongation/restriction operators are linear, they can be represented as matrices. The multigrid method can be described by the following pseudocode.

```
multigrid( L, x, f):
    k=0
    while not converged to tolerance
        relax L⁰x⁰ = f⁰ with v iterations //relaxation
        r⁰ = f - L⁰x⁰    //compute the residual
        r¹ = Rr⁰         //restrict the residual
        c = 0            // initialize the correction to zero
        multigrid_recursion( k+1, c, r¹)
        xᵏ = xᵏ + Pc     // update the solution with the
                         // prolongation correction
    end
```

The recursive function is defined by

```
multigrid_recursion( k, y, d):
    if k = k_MAX then solve Lᵏy = d exactly
    else
        relax Lᵏyᵏ = dᵏ with v iterations // relaxation
        rᵏ = dᵏ - Lᵏyᵏ   // compute the residual
        rᵏ⁺¹ = Rrᵏ        // restrict the residual
        c = 0             // initialize the correction
        multigrid_recursion( k+1, c, rᵏ⁺¹)
                          // continue recursion
        yᵏ = yᵏ + Pc      // update the solution with
                          //   the   prolongation
correction
    end.
```

Multigrid methods involve: (1) specifying the restriction operator; (2) specifying the prolongation operator; and (3) producing a coarsened operator. The prolongation and restriction operators are formally adjoint to each other, where two operators, A and A*, are adjoint if $\langle Ax, y \rangle = \langle x, A^*y \rangle$ is satisfied. For a finite, linear, operator represented by matrix A, the adjoint is given by $A^* = A^T$.

An exemplary prolongation operator is defined through bilinear interpolation. However, this operator does not respect the edge weights and therefore may interpolate over object boundaries. Therefore, according to an embodiment of the invention, a weighted bilinear interpolation is used, with weights given by the edge weights. Specifically, the prolongation operator proceeds in three steps for values at the fine level, $x^0$, and the coarse level, $x^1$. For ease of exposition, a north/south/east/west notation is used to indicate the neighbors of a node and the corresponding weight between them.

$$x^0(2i, 2j) = x^1(i, j) \forall i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W}$$

In essence, the first step injects the coarse-level solution to the fine grid. The subsequent equations describe a weighted bilinear interpolation over the remaining fine-level pixels. Note that for a unity-weighted (i.e., homogeneous) domain, this operator becomes standard bilinear interpolation.

Figure 1:
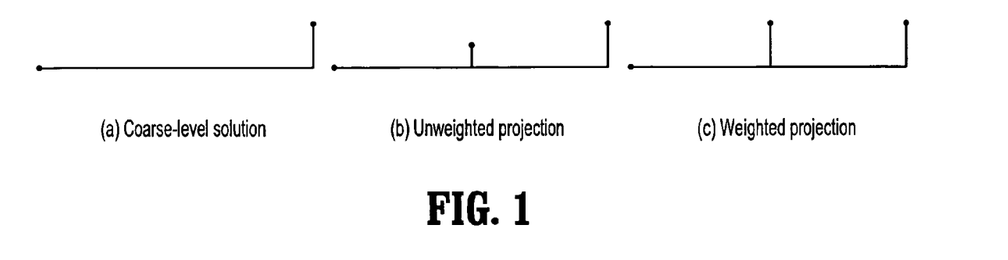
FIGS. 1(a)-(c) depicts a 1D projection over an object boundary, according to an embodiment of the invention.

FIGS. 1(a)-(c) depicts a 1D projection over an object boundary, represented by the vertical, dashed line, and the effects of applying a standard versus a weighted projection. FIG. 1(a) represents a current solution at the coarse level. An unweighted projection operator is depicted in FIG. 1(b). Note that the projected values do not respect the object boundary. A weighted projection operator is illustrated in FIG. 1(c). Note that the weighted restriction operator can be defined as the adjoint of the weighted prolongation operator.

An exemplary restriction operator is defined as the adjoint of the weighted prolongation operator defined above. This adjoint can be written in four steps.

$$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

The factor $d_N$ denotes the degree of the node to the north, etc. Effectively, one can think of this operator as reversing the projection. Note that a unity weighted lattice (i.e., homogeneous domain) would cause the weighted restriction operator above to be a standard "full-weighting" restriction.

The standard multigrid operator coarsening, given an adjoint prolongation/restriction operator, is $$L^{k+1} = RL^k P.$$

However, this construction of a coarsened operator yields a matrix whose sparsity pattern does not correspond to a lattice representation, resulting in lower efficiency implementation of coarse operations and representation. In addition, this construction can result in negatively valued diffusion coefficients, which do not yield a true Laplacian.

According to an embodiment of the invention, a method of coarsening a fine-level L while maintaining the sparsity structure of a lattice treats the vertical/horizontal weights as two $(N-1)\%(N-1)$ images, and applies the restriction operator to determine the weights of the coarse lattice. A restriction operator so applied is referred to as a full weighting operator. In this embodiment, weights between grid nodes are associated with the nodes instead of the usual edges for purposes of applying the restriction operator, which applies to functions defined on the set of nodes. Since there are $(N-1)\%(N-1)$ edge weights for an $N\%N$ image, the result is an $(N-1)\%(N-1)$ grid. The restriction/prolongation operators defined above are then applied to this lattice. In addition, the marked nodes can also be incorporated into the higher-level operator. This is done by considering a coarse-level node to be marked if any of its eight fine-level neighbors are also marked.

Figure 2:
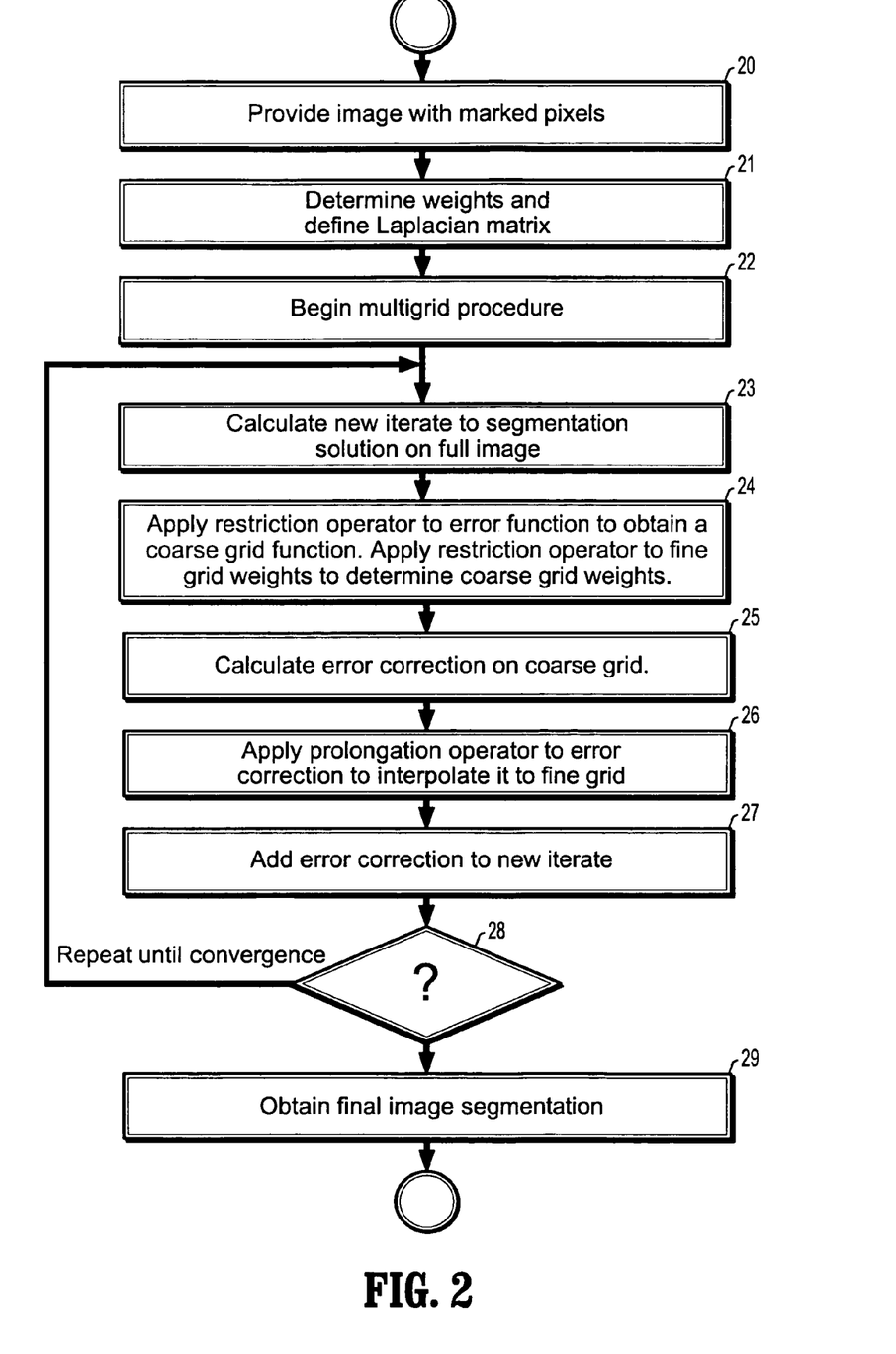
FIG. 2 depicts a flow chart of a multigrid solver according to an embodiment of the invention.

FIG. 2 depicts a flow chart of a multigrid solver according to an embodiment of the invention. At step 20, in image with a set $V_M$ of marked pixels with K labels is provided, either automatically or through the intervention of a medical practitioner. At step 21, edge weights for the lattice representing the image are defined from the pixel intensities according to $w_{ij} = \exp(-\beta(g_i - g_j)^2)$, where $g_i$ and $g_j$ are the intensities of pixels i, j, respectively. This Gaussian weighting function is exemplary, and other weighting functions can be used and still be within the scope of an embodiment of the invention. With these weighting functions, a Laplacian matrix L can be defined for the segmentation of the image. The probability potential for each unmarked point i with respect to a marked point s can be represented by $x_i^s$ and the unmarked probability potentials form a vector $x_U$. The probability potentials for each unmarked point are determined by solving $L_U x_U = f$, wherein $f$ is a function. The segmentation can be determined by assigning a point is to a segment of a marked node according to $\max_s(x_i^s)$.

At step 22, the multigrid procedure for determining the segmentation begins. At step 23, a new iterate to the solution $x_i^s$ is calculated on the full image. At step 24, a restriction operator R is calculated according to the averaging formulae defined above. This restriction operator is then applied to the error $(f - L_U x_i^s)$ to obtain a coarse grid function d. The weights of the coarse grid are determined from the weights of the fine grid by applying the restriction operator to the $(N-1)\%(N-1)$ grid of weights, as defined above. The correction $L_U^{-1} d$ is calculated on the coarse grid at step 25, and at step 26, the correction is interpolated back to the fine grid using a weighted bilinear-interpolation as the prolongation operator P, as defined above. At step 27, the error correction $PL_U^{-1} d$ is added to the uncorrected iteration $x_i^s$ to obtain a corrected iteration. At step 28, the procedure returns to step 23 to calculate the next iteration. The steps 23, 24, 25, 26, 27, and 28 are repeated until convergence of the solution. Note that, after convergence, the solution for the $N^{th}$ $x_i^s$ can be determined from $$x_i^f = 1 - \sum_{s < f} x_i^s.$$

At step 29, a final segmentation can be obtained by assigning to each node $v_i$ the label corresponding to the $\max_s(x_i^s)$. Thus, the node $v_i$ will be assigned to the segment of the marked node with the maximum probability potential. It is to be understood that although the multigrid technique was illustrated above with a 2-level grid, it can be easily applied to an n-level grid by one skilled in the art.

Numerical experiments have demonstrated that a multigrid solver according to an embodiment of the invention has a nearly linear relationship to data size.

Figure 3:
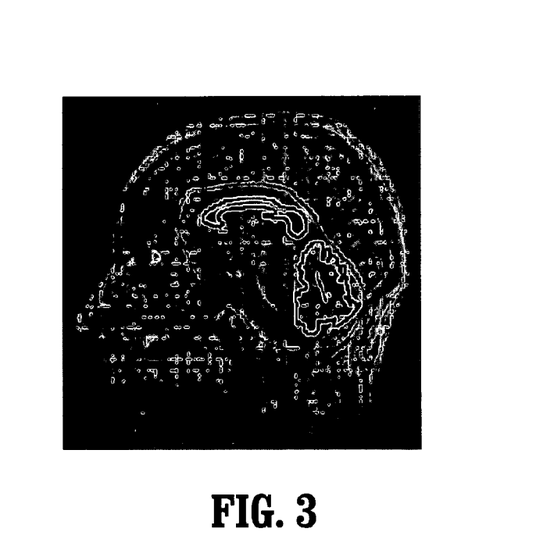
FIG. 3 depicts an example of segmentation obtained from a multigrid algorithm according to an embodiment of the invention.

FIG. 3 depicts an example of segmentation obtained from a multigrid algorithm according to an embodiment of the invention. Gray marks in the image represent the result of user interaction to identify three objects (corpus callosum, cerebellum, and background) for segmentation. These gray marks serve as seeds for the segmentation. The thick black lines indicate the computed segment boundaries. Even though no prior knowledge is incorporated into the multilabel algorithm, the algorithm can correctly segment both objects, despite unusual shapes and textures.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
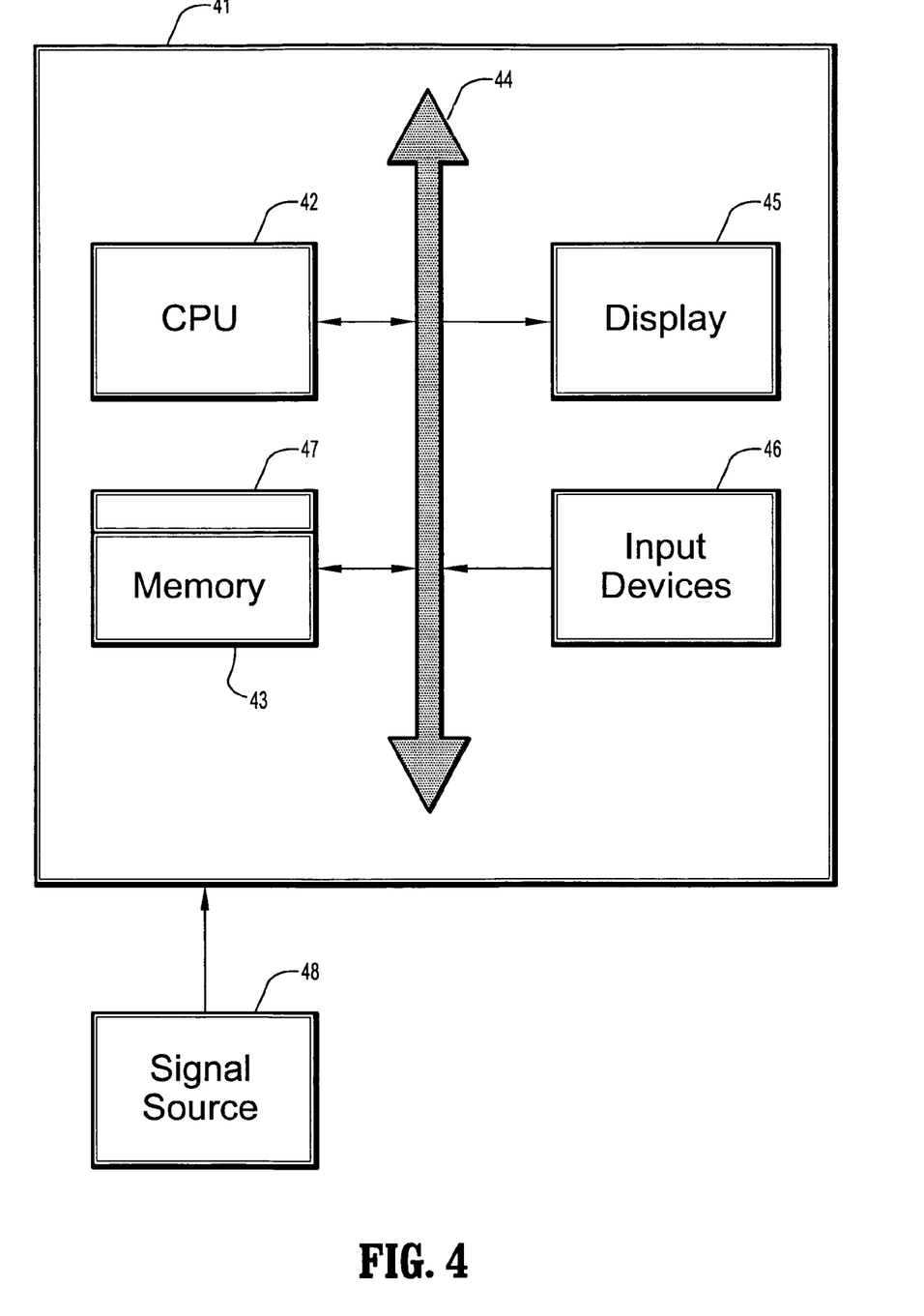
FIG. 4 is a block diagram of an exemplary computer system for implementing a multigrid scheme according to an embodiment of the invention.

FIG. 4 is a block diagram of an exemplary computer system for implementing a multigrid scheme according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer-implemented method of segmenting a digitized image comprising the steps of:

providing a digitized image comprising a plurality of intensities corresponding to a domain of points on an N×N grid wherein N is a positive integer;

defining a weight between each pair of adjacent points in the image based on the intensity difference of each said point pair;

marking a subset of points in the image;

associating a probability potential with each unmarked point; and using a multigrid method and a computer to solve for the probability potentials for each unmarked point, wherein a restriction operator for the image is applied to an (N−1)×(N−1) image wherein each said weight in the image is associated with an adjoining point to define a weight for applying said restriction operator, wherein said restriction operator determines weights of a coarse level grid.

2. The method of claim 1, wherein the probability potential for each unmarked point represents the probability that a random walker starting from each said unmarked point reaches a marked point.

3. The method of claim 2, wherein the probability that a random walker starting from an unmarked point reaches a marked point is calculated for each marked point, 4. The method of claim 1, wherein each said weight $w_{ij}$ between a point $v_i$ adjacent to point $v_j$ is determined by $$w_{ij} = \exp(-\beta(g_i - g_j)^2),$$

where $g_i$ and $g_j$ are the intensities of points i and j, respectively, and $\beta$ is a free parameter.

5. The method of claim 1, further comprising representing said image by a Laplacian matrix L indexed by point pairs, wherein an element $L_{ij}$ for points i and j is defined by $$L_{ij} = \begin{cases} d_i & \text{if } i = j, \\ -w_{ij} & \text{if } i \text{ and } j \text{ represent adjacent points}, \\ 0 & \text{otherwise} \end{cases}$$

where $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability potential for each unmarked point i with respect to a marked point s by $x_i^s$, said unmarked probability potentials forming a vector $x_U$, wherein the probability potentials for each unmarked point can be determined by solving $L_U x_U = f$, wherein $f$ is a function.

6. The method of claim 5, wherein a point is assigned to a segment of a marked point according to $\max_s(_i^s)$.

7. The method of claim 1, wherein said multigrid method comprises calculating an approximate solution to the probability potentials on a fine level grid, calculating a residual to the approximate solution, restricting the residual to said coarse level grid with said restriction operator, calculating a correction for the residual on the coarse level grid, and correcting the approximate solution on said fine level grid with a prolongated correction using a prolongation operator, wherein said prolongation operator is an adjoint of said restriction operator.

8. The method of claim 7, wherein said prolongation operator from a point $x^1(i, j)$ on the coarse grid to a point on the fine grid $x^0$ is defined by the transformations $$x^0(2i, 2j) = x^1(i, j) \forall i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a point and their corresponding weights.

9. The method of claim 7, wherein said restriction operator from a point on the fine grid $x^0$ to a point $x^1(i, j)$ on the coarse grid is defined by the transformations $$x^0(2i+1, 2j) = x^0(2i+1, 2j) + \frac{w_E x_E^0}{d_E} + \frac{w_W x_W^0}{d_W}$$

$$x^0(2i, j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a point and their corresponding weights, and the factors $d_E, d_W, d_N, d_S$ denote the corresponding degrees of the neighboring points.

10. The method of claim 1, wherein a coarse level point is marked if any of its fine level neighbor points are marked.

11. A computer-implemented method of segmenting a digitized image comprising the steps of:
providing a digitized image comprising a plurality of intensities corresponding to a domain of points on an N×N grid wherein N is a positive integer;
defining a weight $w_{ij}$ between each pair of adjacent points indexed by i, j in the image based on the intensity difference of each said point pair;
representing said image by a Laplacian matrix L indexed by point pairs, wherein an element $L_{ij}$ for points i and j is defined by $$L_{ij} = \begin{cases} d_i & \text{if } i = j, \\ -w_{ij} & \text{if } i \text{ and } j \text{ represent adjacent points,} \\ 0 & \text{otherwise,} \end{cases}$$

where $d_i = \Sigma w_{ij}$ for all weights incident on point i,
using a multigrid method and a computer to solve a potential for each point on said image, wherein a restriction operator for the image is applied to an (N−1)×(N−1) image wherein each said weight in the image is associated with an adjoining point to define a weight for applying said restriction operator, wherein said restriction operator determines weights of a coarse level grid.

12. The method of claim 11, further comprising marking a subset of points in the image, wherein said potential is associated with each unmarked point and represents the probability that a random walker starting from each said unmarked point reaches a marked point.

13. A program storage device readable by a computer, tangibly embodying a program of instructions executable by the computer to perform method steps for segmenting a digitized image, the method comprising the steps of:
providing a digitized image comprising a plurality of intensitie corresponding to a domain of points on an N×N grid;
defining a weight between each pair of adjacent points in the image based on the intensity difference of each said point pair;
marking a subset of points in the image;
associating a probability potential with each unmarked point; and
using a multigrid method to solve for the probability potentials for each unmarked point, wherein a restriction operator for the image is applied to an (N−1)×(N−1) image wherein each said weight in the image is associated with an adjoining point to define a weight for applying said restriction operator, wherein said restriction operator determines weights of a coarse level grid.

14. The computer readable program storage device of claim 13, wherein the probability potential for each unmarked point represents the probability that a random walker starting from each said unmarked point reaches a marked point.

15. The computer readable program storage device of claim 14, wherein the probability that a random walker starting from an unmarked point reaches a marked point is calculated for each marked point.

16. The computer readable program storage device of claim 13, wherein each said weight $w_{ij}$ between a point $v_i$ adjacent to point $v_j$ is determined by $$w_{ij} = \exp(-\beta(g_i - g_j)^2),$$

where $g_i$ and $g_j$ are the intensities of points i and j, respectively, and $\beta$ is a free parameter.

17. The computer readable program storage device of claim 13, the method further comprising representing said image by a Laplacian matrix L indexed by point pairs, wherein an element $L_{ij}$ for point i and j is defined by $$L_{ij} = \begin{cases} d_i \\ -w_{ij} & \text{if } i = j, \\ 0 & \text{if } i \text{ and } j \text{ represent adjacent points,} \end{cases}$$

where $d_i = \Sigma w_{ij}$ for all weights incident on point i, decomposing L as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, representing the probability potential for each unmarked point i with respect to a marked point s by $x_i^s$, said unmarked probability potentials forming a vector $x_U$, wherein the probability potentials for each unmarked point can be determined by solving $L_U x_U = f$, wherein $f$ is a function.

18. The computer readable program storage device of claim 17, wherein a point is assigned to a segment of a marked point according to $\max_s(x_i^s)$.

19. The computer readable program storage device of claim 13, wherein said multigrid method comprises calculating an approximate solution to the probability potentials on a fine level grid, calculating a residual to the approximate solution, restricting the residual to said coarse level grid with said restriction operator, calculating a correction for the residual on the coarse level grid, and correcting the approximate solution on said fine level grid with a prolongated correction using a prolongation operator, wherein said prolongation operator is an adjoint of said restriction operator.

20. The computer readable program storage device of claim 19, wherein said prolongation operator from a point $x^1(i, j)$ on the coarse grid to a point on the fine grid $x^0$ is defined by the transformations $$x^0(2i, 2j) = x^1(i, j) \forall i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a point and their corresponding weights.

21. The computer readable program storage device of claim 19, wherein said restriction operator from a point on the fine grid $x^0$ to a point $x^1(i, j)$ on the coarse grid is defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a point and their corresponding weights, and the factors $d_E, d_W, d_N, d_S$ denote the corresponding degrees of the neighboring points.

22. The computer readable program storage device of claim 13, wherein a coarse level point is marked if any of its fine level neighbor points are marked.

* * * * *